United States Patent [19]

Boothman

[11] Patent Number: 4,510,548
[45] Date of Patent: Apr. 9, 1985

[54] ROTOR PROTECTION APPARATUS AND METHOD

[75] Inventor: David R. Boothman, Ennismore, Canada

[73] Assignee: General Electric Company, Salem, Va.

[21] Appl. No.: 575,751

[22] Filed: Feb. 1, 1984

[30] Foreign Application Priority Data

Feb. 11, 1983 [CA] Canada .................................. 421423

[51] Int. Cl.$^3$ ............................................. H02H 7/08
[52] U.S. Cl. .................................... 361/25; 318/798; 318/806; 361/24; 361/76
[58] Field of Search ................ 318/798, 806, 471–473; 361/25, 24, 76; 364/557; 340/648

[56] References Cited

U.S. PATENT DOCUMENTS 3,743,889 7/1973 Lopez-Batiz .
4,467,260 8/1984 Mallick, Jr. et al. ................ 318/800

FOREIGN PATENT DOCUMENTS 983094 2/1976 Canada .
1144595 4/1983 Canada .

OTHER PUBLICATIONS

U.S. Ser. No. 488,449, 4/25/83, Boothman et al.
"Induction Machine" by Philip L. Alger, Second Edition, Gordon and Breach Science Publishers, p. 265.
"Standard Handbook for Electrical Engineers"-11th Edition, pp. 2-48.
"A Microcomputer Based Symmetrical Component Distance Relay" A. G. Phadke et al.-1919 Power Industry Computer Applications Conference.

Primary Examiner—David Smith, Jr.
Attorney, Agent, or Firm—Arnold E. Renner

[57] ABSTRACT

Apparatus and method for protecting a squirrel cage induction motor against excessive temperatures which can occur in the rotor, provides a thermal model of the rotor. The thermal model has three regions A, B and C representing the starting portion of the rotor conductor, and the rotor core. The rotor is frequency sensitive and currents of higher frequency induced in the conductors tend to be in region A, and currents of lower frequency tend to be in region B. Equipment connected to the stator winding determines values for the positive and negative sequence components of the supply for the fundamental frequency and preferably also for the second and third harmonics present, and provides signals representing these values. Heat calculation circuitry receives the values for all the positive and negative sequence components and a signal representing speed, determines the currents that would be induced in regions A, B and C, and derives equivalent currents which would produce the same heat. A summing circuit sums these equivalent currents for each of the regions A, B and C and applies the summed values to a first, second and third storage devices which stores the values representing temperatures. Interconnections between the three storage devices simulate the thermal resistances between the regions A, B and C and the thermal resistance to ambient. A temperature detector is connected to each storage device and when the value stored in the storage device reaches a predetermined level representing a critical temperature, the detector provides a trip signal which interrupts the supply of power to the motor.

17 Claims, 5 Drawing Figures

ROTOR PROTECTION APPARATUS AND METHOD

BACKGROUND OF THE INVENTION

This invention relates to the protection of induction motors, and in particular it relates to apparatus and method for the protection of rotors in squirrel cage induction motors.

It is known to provide protection of various types for alternating current (A.C.) motors. One well known type of protection is the overload relay which disconnects the motor from the power source when the current exceeds a predetermined level for a certain time. Another type of protection apparatus uses a resistor-capacitor network to simulate the motor stator where the capacitor represents the thermal capacity of the conductors and an associated resistor represents the thermal resistance of the insulation. The capacitor is charged on one side by a current representing heat generated by copper loss in the conductor, and it is charged on the other side by a current representing the temperature at the outer surface of the insulation determined from a temperature sensor. The network can thus be used as an analog of the heat in the winding and can be used to disconnect the motor from the supply to prevent damage to the insulation. An example of this type of protection is described in Canadian Patent No. 983,094—Boothman et al., issued Feb. 3, 1976 and granted to Canadian General Electric Company Limited.

Another type of apparatus for protecting motors is described in U.S. patent application Ser. No. 488,449 by D. R. Boothman, et al., filed Apr. 25, 1983 (corresponding to Canadian Patent Application Serial No. 402,483—Boothman et al., filed May 7, 1982) and assigned to Canadian General Electric Company Limited. This apparatus provides a digital thermal model of the motor. The thermal model is, however, primarily a thermal model of the stator. Any thermal characteristics of the rotor are not directly considered, although some of the thermal effects of the rotor may to some extent appear in the stator thermal characteristics. In the apparatus described in this co-pending application, a sensor and an analog to digital converter store in a first register a value representing heat generated in the conductors. A second register holds values representing core temperature. Values are determined for heat transferred away from the conductors and also for heat transferred into the core. One is subtracted from the first register and the other is added to the second register. Another value is determined for heat lost by the core material, and this value is subtracted from the second register. Thus the first and second registers hold values representing conductor temperature and core temperature respectively, and these can be used to interrupt the supply of power to the motor when a predetermined level is exceeded in either register.

It is, of course, known that phase loss and phase reversal in the supply of power to a three phase motor can cause severe problems with generation of heat. Many systems have been designed to overcome this. For example, U.S. Pat. No. 3,743,889 by LOPEZ-BATIZ, issued July 3, 1973 and assigned to Hatch Incorporated describes such a system. However, none of the prior systems are primarily intended for protection of the rotor and they do not use a thermal model of the rotor.

The rotor of a squirrel cage motor is in many cases the limiting consideration in the design and it is important to provide suitable protection for it. A squirrel cage motor should have a high starting torque but maintain a high efficiency at normal operating speeds. In order to achieve the desired characteristics, the designer of a squirrel cage motor intentionally designs the rotor to be frequency sensitive. The squirrel cage conductor bar may be made deep and narrow (relatively large in the radial dimension extending inwardly from the rotor periphery, and relatively narrow in the peripheral or circumferential direction). A more detailed description of the design procedures for deep rotor bars can be found in books, such as, for example, "Induction Machines", Philip L. Alger, Second Edition, Gordon and Breach Science Publishers, about page 265. When a conductor bar is made deep and narrow, the current will be crowded towards the top (i.e., towards the peripheral end) during starting when the slip frequency is high thereby increasing the effective resistance. At operating speed when the slip frequency is low, the current tends to be uniformly distributed giving a low resistance. Indeed, it is also well known to provide a necked portion in the rotor bar to assist in dividing the current during starting from the current at normal operating speeds, although this is not essential as the desired effect appears even in a symmetrical conductor bar.

In other words, during starting, the rotor is designed to have the current in a rotor bar constrained to a smaller cross-section than when running at normal speeds. This provides the desired higher starting torque while retaining a high efficiency at running speeds. When the rotor is designed to be frequency sensitive to obtain desired starting/running characteristics, it is, of course, also frequency sensitive to other frequency related conditions, such as for example, discrepancies in the symmetry of the supply, improper phase sequence and harmonic content. This is in addition to phase loss and phase reversal problems which, in effect, cause positive and/or negative sequence frequency components of current which may be at higher frequencies.

The use of symmetrical positive and negative sequence current components in analyzing electrical apparatus is well known. Dr. Charles L. Fortescue described this in his 1918 paper entitled "Method of Symmetrical Co-ordinates Applied to the Solution of Polyphase Networks", Trans AIEE, about page 1027. Further references and further description may be found in the Standard Handbook for Electrical Engineers, Editor-in-Chief Donald G. Fink, Eleventh Edition, beginning about 2-48. It is believed no detailed explanation is necessary herein.

If one phase of a three phase motor were to be open during starting, high currents would be generated in the stator winding which would result in overheating. The overheating would also occur in a running motor with the rate of heating depending on the load. Similarly, a phase reversal may cause overheating of the stator. Equipment is available to detect a phase loss and a negative phase sequence and to interrupt a power supply if predetermined limits are exceeded. For example, a negative phase sequence time overcurrent relay (type INC77B) is available from General Electric Company. The aforementioned U.S. Pat. No. 3,743,889 describes circuitry capable of detecting positive and negative voltage sequence. In addition, a paper entitled "A Microcomputer Based Symmetrical Component Distance Relay", by A. G. Phadke, T. Hlibka, M. Ibrahim and M.

G. Adamiak, in 1979 Power Industry Computer Applications Conference, describes yet another way of obtaining an evaluation of positive and negative voltage sequences. It does this using a microcomputer and in addition it readily provides an evaluation of positive and negative voltage sequences of any desired harmonics.

When a squirrel cage motor is running and the power supply has only a positive sequence, the current in the rotor bars is at slip frequency. However, any unbalance will introduce a negative sequence current component which, because of the rotational speed of the motor, will be at almost twice the line frequency. Similarly, any harmonics which appear in the supply will not only affect the stator but will appear in the rotor and, if there is a negative sequence component, will appear as a multiple of the harmonic frequency. Because the rotor is designed to be frequency sensitive, the greater the frequency, the greater will be the overheating. Thus, the rotor often is affected more than the stator by any irregularities in the supply.

SUMMARY OF THE INVENTION

It is, therefore, an object of the invention to provide a thermal model of a rotor in a squirrel cage motor.

It is another object of the invention to provide an apparatus and method which protects the rotor of a squirrel cage motor.

It is yet another object of the invention to provide an apparatus and method responsive to the three phase input to a squirrel cage motor to simulate temperatures in the rotor to detect overtemperature conditions.

In its broadest form the present invention is concerned with determining values for at least the positive sequence current components of the fundamental frequency of the current supply to the motor and to provide protection based on this. If there is no unbalance in the supply, there will be no negative sequence components and if there are no harmonics present in the supply, the determination of values for the positive sequence current components of the fundamental frequency of the supply will be sufficient to model the temperatures in the rotor. If there is any unbalance, the negative sequence components become significant as their frequency is greater, except for a locked rotor condition where the frequency is the same as the corresponding positive sequence component. If there are harmonics present in the supply they will be significant also because of their higher frequency. It is, of course, preferred to provide protection against unbalance and harmonics and, therefore, it is preferred to determine values for positive and negative sequence components and for at least the fundamental and lower frequency harmonics in the supply.

Accordingly, there is provided an apparatus and method for protecting an induction motor having a stator having a stator winding for connection to an alternating current supply of two or more phases and a squirrel cage rotor. The rotor has a plurality of conductors each having a starting portion and a main portion. Currents of higher frequency induced in said conductors tend to be in the starting portion and currents of lower frequency tend to be in the main portion. Values for at least the positive sequence current components are determined and are used to derive first signals representing the positive sequence components. Also developed is a second signal representing the rotational speed of said rotor. In response to these first and second signals, a heat calculation is performed to determine the current induced in the starting portions and main portions of said conductors, and to derive equivalent current values for each said component for at least said starting portions and main portions of said conductors that would generate equivalent heat therein. The equivalent current values for each of said at least said starting portions and said main portions of said conductors are summed. Storage is provided for each of the starting portions and the main portions of said conductors for receiving the respective equivalent current to store a value representing the temperature. Between each of the storage capabilities is a representation of thermal resistance to adjust the value of each stored value according to a heat transfer relationship. At least one of the stored values is adjusted by a representation of thermal resistance to ambient to compensate for heat lost to ambient. Temperature detection responsive to each stored value determines if the value stored represents temperature exceeding a predetermined value representing a maximum temperature and for providing power interrupting signal when said stored value exceeds said predetermined value.

BRIEF DESCRIPTION OF THE DRAWING

The invention will be described in more detail with reference to the accompanying drawings, in which.

DETAILED DESCRIPTION

Figure 1:
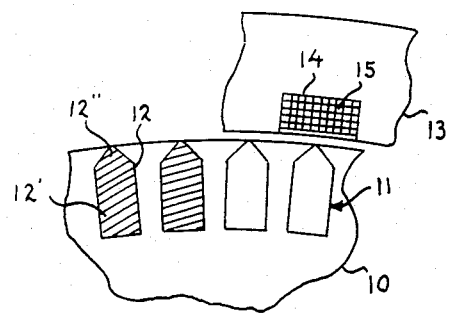
FIGS. 1 and 2 are partial end views of two embodiments of rotor cores and their relationship to the stator.

Referring first to FIG. 1, portions of a sheet of rotor core material 10 is shown having slots 11 therein. As is known, the rotor is formed of stacks of slotted core sheets of a required configuration with the slots aligned to receive the conductor bars. Disposed within slots 11 are bars 12, having a cross-sectional configuration identical to slots 11, which have a deep portion 12' with substantially parallel sides and a peripheral or outer portion 12" where the sides converge. This design is intended to provide a conductor bar with a smaller cross-section at the outer or peripheral portion to provide increased resistance during starting as was previously discussed. A portion of a stator 13 having slots 14 within which stator windings 15 are disposed is shown adjacent the rotor portion 10.

Figure 2:
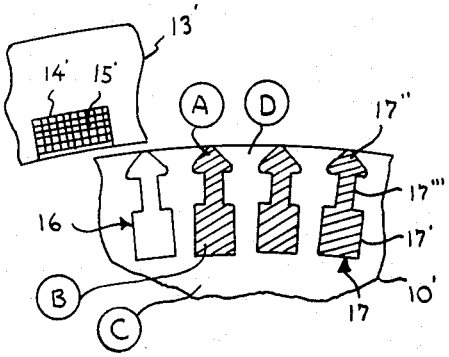

In FIG. 2, a somewhat different rotor slot configuration is shown at 16. Here conductor bars 17 of the same configuration as slots 16 extend through aligned slots 16 and have a lower or deep portion 17' and an upper or peripheral portion 17" joined by a necked portion 17'''. The peripheral portion 17" is intended to provide higher resistance for starting and the necked portion increases the degree by which the bars are sensitive to slip frequency.

It will be seen that heat will be generated largely in the peripheral portions 12" and 17", of conductors 12 and 17 respectively, during initial starting, and heat will be generated mostly in portions 12' and 17', of conductors 12 and 17, respectively during running at normal operating speeds. These conductor portions can be generally designated as A and B, i.e., the starting portion and the main portion or running portion. It should be noted that because starting currents with their higher frequency tend to be forced to the outer portions of the conductor bars, it is not essential to provide an outer portion which has a reduced cross-sectional area. This crowding of the starting current outwardly results in increased resistance and increased starting torque. In the case of a symmetrical conductor bar, the current during starting is still represented by A and will provide increased resistance and starting torque. Nevertheless, it is preferred to use a cross-sectional shape where the outer portion is of reduced size. The temperatures of the conductor portions A and B are of considerable interest. The temperature of the core material itself is also of interest and can be designated as region or portion C. These are shown on FIG. 2 only, but they would, of course, apply to corresponding regions in FIG. 1. As was the case with respect to FIG. 1, a stator portion 13' having slots 14' and windings 15' are also shown.

When a thermal model is constructed, any number of regions may be selected. The three regions A, B and C are suitable and provide satisfactory results. However, other regions such as, for example, D in FIG. 2 might be included also. There is no theoretical limit to the number of regions that could be considered, but there is a practical limit in constructing a suitable thermal model. Three regions will be discussed hereinafter with region C representing the entire core.

Region A may perhaps be considered as the most critical. During starting, the temperature of region A, the starting portion of the conductors, will rise rapidly and will normally exceed the running temperature of the conductors. As the motor approaches normal running speed, the current through region A will decrease and less heat will be generated. The current in region B will increase as normal running speed is reached and this region will carry most of the current during normal running. The temperature of region A will fall during normal running and will stabilize at a temperature substantially the same as region B as part of the heat from region B flows into region A. Thus, if only one region were to be modelled to protect the rotor, it is reasonable to select region A. The invention in its broadest form would use a thermal model of region A to detect when critical temperatures is reached. It will be seen that in another form a time concept might be introduced, still involving only region A. For example, if a temperature were determined for region A, it might be calculated it should never exceed a critical temperature of 300° C. and it should not exceed 175° C. for more than three minutes. Thus modelling of region A only could be used for protection during starting and to some extent during running. It is however, preferred to use the three regions A, B and C.

Figure 3:
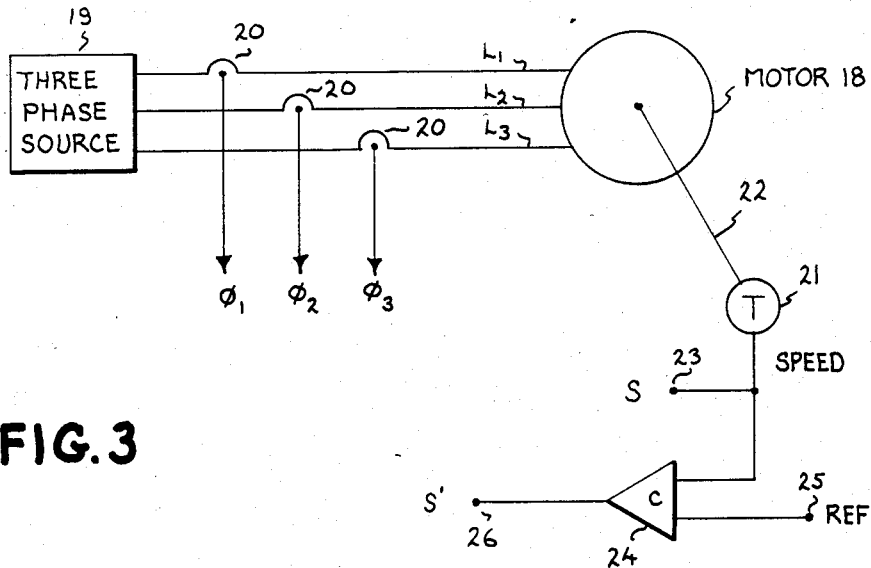
FIG. 3 is a schematic diagram illustrating the derivation of certain signals used in the present invention.

FIG. 3 illustrates, in schematic form, the development of several signals which are used in the implementation of the present invention. In FIG. 3, a polyphase phase (e.g., three phase) squirrel cage induction motor 18 receives electrical power via lines $L_1$, $L_2$, and $L_3$ from a polyphase (e.g., three phase) power source 19. Through suitable means such as current transformers 20, there are developed three signals $\phi_1$, $\phi_2$ and $\phi_3$ proportional, respectively, to the currents in lines $L_1$, $L_2$, and $L_3$.

Two additional signals related to motor rotational speed are also developed in FIG. 3. As shown, a suitable speed indicating means such as a tachometer 21 is connected via connection 22 to the motor 18 to provide an output signal which is proportional to motor speed. This signal, which may be digital or analog in accordance with the requirements of the overall system is first provided to an output terminal 23 where it is designated S. The speed signal from tachometer 21 is also provided as one input to a comparator 24, the second input to which is a reference signal from an input terminal 25. The reference signal may be derived from any suitable source, such as an operator input, and has a value representative of some prescribed value; e.g., rated motor speed. The output of comparator 24 as seen at terminal 26 is designated S' and would normally be a binary signal the state of which indicates whether or not the actual motor speed is below the speed represented by the value of the reference signal.

In certain instances, a simple indication of whether or not the rotor is rotating may be sufficient for the system's requirements insofar as the speed signal is concerned. One simple way of achieving an indication of this rotational state for use as the speed signal would be to sum the three current signals $\phi_1$, $\phi_2$ and $\phi_3$ and to determine if that summed value was significantly larger (e.g., three to six times) than the rated motor current. If the summed value is of this higher value, then the motor is assumed to be in a stall conditon and the speed signal will have a first binary value. If the summed value is less than this higher value but greater than zero, then the motor is assumed to be energized and rotating and the speed signal will have a second binary value.

Figure 4:
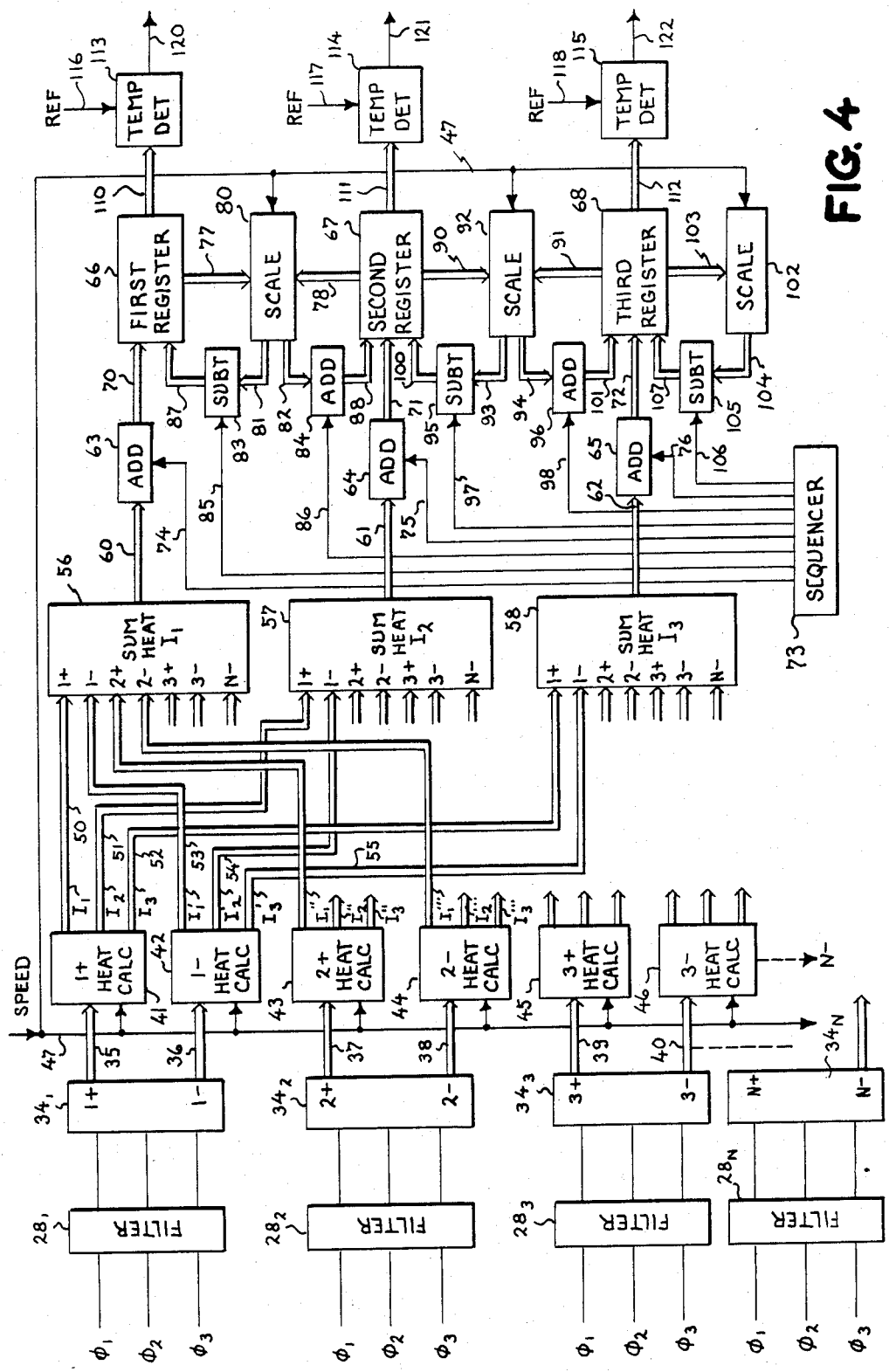
FIG. 4 is a schematic diagram of a rotor thermal model in accordance with a preferred embodiment of the present invention; and, FIG. 5 is a simplified circuit diagram representing a thermal model of a rotor.

Reference is now made to FIG. 4 which illustrates a rotor thermal model in accordance with the present invention. In FIG. 4, three current signals $\phi_1$, $\phi_2$ and $\phi_3$, such as those developed in FIG. 2 are applied to each of a plurality of filter circuits. In the depiction of FIG. 4, four such filter circuits $28_1$, $28_2$, $28_3$ and $28_N$ are shown. These filter circuits are band pass filters and serve, respectfully, to pass currents having the fundamental frequency ($28_1$), the second harmonic of the fundamental ($28_2$), the third harmonic of the fundamental ($28_3$), and so forth, with filter $28_N$ representing all additional harmonics which are desired to be considered.

The outputs of the several filter circuits are applied, to respective evaluation devices $34_1$, $34_2$, $34_3$ and $34_N$. Each of these devices evaluates the positive and, if applicable, negative current sequences with respect to its applied signals. Blocks $34_1$ to $34_N$ may, therefore, each represents circuitry as described in the aforementioned U.S. Pat. No. 3,743,889 connected to suitable filters for obtaining the desired harmonics for evaluation. Alternatively, the blocks $34_1$ to $34_N$ may represent a microcomputer based system described in the Phadke et al. paper referred to previously. Any device or system which is able to provide an evaluation of the positive and negative sequences for the fundamental supply frequency, and if desired for one or more harmonic frequencies, may be used.

Using device $34_1$ as an example, its outputs on lines 35 and 36 are digital signals representing, respectively, the evaluation of the positive sequence of the fundamental frequency (1+) and the evaluation of the negative sequence fundamental frequency (1−). Similarly, devices $34_2$ provide outputs on buses 37 and 38 with respect to the second harmonic while devices $34_3$ to $34_N$ provide outputs as illustrated with respect to the third to $N^{th}$ harmonics. It may on the other hand, be considered as unnecessary to have an evaluation of any harmonics; i.e., that the positive and negative sequences of the fundamental are adequate. Alternately, if the supply is balanced, there will be no negative sequence component, and under circumstances where this may occur it may be necessary to evaluate positive sequences only. In general, in order to operate accurately with supplies that may have significant harmonic content it is desirable to include an evaluation of the lower harmonics, particularly as this evaluation does not add greatly to the cost when a microcomputer based system is used (as described in the Phadke et al. paper referred to previously).

Each bus 35–40 thus carries a signal which is a digital number representing the evaluation of the respective sequence and frequency. Each bus 35–40 is connected to a respective heat calculator circuit 41–46. A motor speed signal is available on conductor 47 and this is connected as a second input to each of the heat calculator circuits 41–46.

The motor speed signal shown in FIG. 4 is, in the simpler embodiment, that signal developed in FIG. 3 which is designated S' and which is a simple signal indicating that the motor is, or is not, running at operating speed. If it is running at operating speed, the heat generation in the regions A, B and C (FIG. 2), the heat transfer and heat dissipation are determined in accordance with one set of calculations. If the motor is not running at operating speed, it is assumed to be in the starting mode and the heat generation, heat transfer and dissipation for regions A, B and C (FIG. 2) are determined in accordance with another set of calculations. Thus, the signal on conductor 47 is a simple digital signal indicating one of the two conditions. Under some circumstances this simple speed signal may not provide for sufficient accuracy, and in another embodiment, the conductor 47 is replaced by a bus which carries a digital signal representative of the signal S' in FIG. 3 which is representing actual rotational speed. This will permit a more accurate evaluation when, for example, the starting mode continues for a longer than normal period as will be more fully explained.

Each of the heat calculators 41–46, et seq., provides a substantially identical function with respect to its input signals which represent the heat developed in each of the three regions A, B and C (FIG. 2). Using heat calculator 41 as an example, let it be assumed first that the motor is not rotating and that the speed signal on line 47 is the S' signal and is a binary zero. It will be remembered from the previous discussion that the signal on bus 35 represents the value of the positive sequence fundamental frequency currents. Heat calcualtor 41 has stored therein three constants which are pertinent to this situation which are here designated $K_1$, $K_2$ and $K_3$. These three constants are a function of the motor design and geometry and are supplied by the motor designer. $K_1$ is proportional to the effective resistance of the outer portion A of the conductor bar while $K_2$ is proportional to the effective resistance of the inner portion B of the conductor bar. $K_3$ is a constant representing core loss of the motor in its energized state.

With the above inputs, heat calculator 41 will develop three output signals shown in FIG. 4 as $I_1$, $I_2$ and $I_3$ appearing on buses 50, 51 and 52, respectively. If it is now assumed that input signal on bus 35 has a value of M, then output $I_1$ on bus 50 will have a value proportional to the product of $K_1$ and the square of M (e.g., $I_1 = K_1 \cdot M^2$). The output signal $I_2$ on bus 51 will have a value proportional to the product of $K_2$ and the square of M (e.g., $I_2 = K_2 \cdot M^2$) while signal $I_3$ on bus 52 will have a value proportional to $K_3$ (e.g., $I_3 = K_3$).

When the motor is rotating and the signal on line 47 is indicative of such, heat calculator 41 will utilize different constants to develop the signals $I_1$ and $I_2$. These constants, here called $K_1'$ and $K_2'$ are proportional to the alternating current impedances of the A and B portions of the conductor bars at the fundamental frequency. The $K_3$ term for the signal $I_3$ will remain the same.

Similarly, the heat calculator circuit 42 receives a signal on bus 36 representing an evaluation of the negative sequence components of the fundamental frequency and a signal on conductor 47 representing motor speed. Circuit 42 makes calculations similar to those described with respect to circuit 41, using the $K_1$, $K_2$, and $K_3$, or $K_1'$, $K_2'$ and $K_3$ values to provide signals on buses 53, 54 and 55 which are the corresponding heat calculations for the fundamental negative sequence components.

The remaining heat calculators perform similar calculations using appropriate values for the harmonic frequency current values which are applied thereto to similarly provide corresponding output signals.

Three summation circuits are provided, one for each of the equivalent currents $I_1$, $I_2$ and $I_3$. These circuits are shown as sum heat $I_1$ circuit 56, sum heat $I_2$ circuit 57, and sum heat $I_3$ circuit 58. To sum heat circuit 56 there is an input representing each of the values for equivalent currents $I_1$ from each of the heat calculator circuits 41–46, etc. Thus, there is an input bus connected to sum heat circuit 56 for the components and frequencies 1+, 1−, 2+, 2−, 3+ and 3−. For simplicity of drawing, all of the buses interconnecting the heat calculator circuits 41–46 and the sum heat circuits 56–58 are not shown in FIG. 4. It is believed that the various interconnections wll be apparent from the showing of the interconnections from buses 50, 51 and 52 (from heat calculator circuit 41) and buses 53, 54 and 55 (from heat calculator circuit 42), and from the preceding description.

The sum heat circuit 56 receives signals representing the values of equivalent currents, of type $I_1$ for the negative and positive components of the fundamental and second and third harmonics, etc. Circuit 56 sums these values and provides an output on bus 60 representing this. Thus, the signal on bus 60 represents a current $I_X$ that would provide the same heat in region A (FIG. 2) that would be provided with the supply to the motor under the existing conditions.

Similarly, the sum heat circuits 57 and 58 receive signals, respectively, representing the values of equivalent currents of the natures of $I_2$ and $I_3$ for the various negative and positive components of the corresponding and harmonic frequencies. Circuits 57 and 58 sum these values and provide respective outputs on buses 61 and 62 representing the summations. The signal on buses 61 and 62 represent, respectively, currents $I_Y$ and $I_Z$ that would provide the same heat in regions B and C (FIG. 2) that would be provided with the supply to the motor under existing conditions.

The signals on buses 60, 61 and 62 are available at respective add registers 63, 64 and 65. The adders or add registers 63, 64 and 65 store the values on respective buses 60, 61 and 62 until they receive a sequencing signal. They then provide the stored digital values over buses 70, 71 and 72 to registers 66, 67 and 68 respectively. A sequencer 73 applies the sequencing signals on conductors 74, 75 and 76 to add registers 63, 64 and 65 respectively to operate the add registers at an appropriate sequenced time as described.

Register 66, referred to in FIG. 4 as the first register, holds a value which represents the temperature of region A (FIG. 2), that is, it represents the temperature of the outer portion of the rotor conductor. Similarly registers 67 and 68, referred to in FIG. 4 as the second and third registers respectively, hold values which represent the temperature of regions B and C respectively where B is the main portion of the rotor conductor and C is the core.

Referring for the moment to FIGS. 1 and 2, there will be a transfer of heat from region A to region B and the rate at which the transfer takes place will depend on the difference in temperature between region A and B as well as the thermal resistance. In addition there may be some heat lost from A that is not transferred to region B and a factor involved may be rotational speed. Similarly there will be a transfer of heat from region B to region C and again the rate will depend on the temperature difference and thermal resistance. There will be heat lost from the core, represented by region C, for example, by forced convection, and this will depend to a considerable extent on the rotor speed. The heat transfers are modelled as closely as possible by the circuitry of FIG. 4.

Referring to FIG. 4, the values from the first register 66 and the second register 67 are available over respective buses 77 and 78 to scale circuit 80. These values represent the temperatures of the outer and main portions of the rotor conductors. The transfer of heat from one to the other will depend on the thermal resistance between them (a fixed value), on the respective thermal capacities (fixed values), and on the temperature difference (a variable value). The scale circuit 80 receives two signals representing the two temperatures and determines the temperature difference. Based on the temperature difference and the fixed thermal values it determines a flow of heat out of region A and a flow of heat into region B. There may be some heat lost to ambient, particularly at the axial ends of the outer rotor conductors, and this heat loss is dependent to some extent upon rotational speed. Conductor 47 is connected to scale circuit 80 and provides a motor speed signal to aid in a determination of this heat loss. A determined value representing heat loss from region A and heat to be added to region B are available on buses 81 and 82 respectively. Buses 81 and 82 are connected to subtract register 83 and add register 84 respectively. In response to signals on conductors 85 and 86 from sequencer 73, subtract register 83 and add register 84 operate to apply the stored values over buses 87 and 88 respectively which are subtracted from and added to registers 66 and 67 respectively.

The values from the second register 67 and the third register 68 are available over bus 90 and 91 at scale circuit 92. These values represent the temperature of the main portion of the rotor conductor and the rotor core. The transfer of heat from one to the other will depend on the thermal resistance which exists between them, (a fixed value), on the respective thermal capacities (fixed values), and on the temperature difference (a variable value). In addition there may be heat lost to ambient from the axial ends of the main portion of the rotor conductors and this heat loss is dependent to some extent upon rotational speed. The scale circuit 92 receives two signals on buses 90 and 91 representing the two temperatures and determines the temperature difference. Based on the temperature difference and the fixed thermal values it determines the flow of heat out of region B and the flow of heat into region C. This is adjusted by an amount calculated for the heat lost to ambient based on a signal on conductor 47 representing motor speed. A determined value representing heat loss from region B and heat to be added to region C is available on buses 93 and 94 respectively. Buses 93 and 94 are connected to subtract register 95 and add register 96 respectively. In response to signals on conductors 97 and 98 from sequencer 73, the subtract register 95 and the add register 96 are operated to apply the values stored therein over buses 100 and 101 respectively which are subtracted from and added to registers 67 and 68 respectively.

The third register 68 represents the temperature of the core. This temperature is relatively steady once operating temperature is reached although there is a flow of heat from the warmer regions adjacent the conductors to the periphery where heat is lost by radiation and/or conduction. The heat loss depends on rotor speed and ambient temperature; that is, on the difference between core temperature and ambient temperature. In the embodiment of FIG. 4 an average ambient temperature is used and this is set into scale circuit 102. It, however, will be apparent that a temperature sensor could be used to feed into scale circuit 102 a signal representing sensed ambient temperature, and this is desirale where the motor is operating in a location where the ambient temperature varies to a considerable extent. In the FIG. 4 embodiment an average value is used for ambient temperature. The temperature value from register 68 is available over bus 103 at scale circuit 102 and the difference between core temperature and ambient temperature determined. Conductor 47 is connected to scale circuit 102 and carries the motor speed signal. Scale circuit 102 determines heat loss to ambient and provides a signal on bus 104 representing this. Bus 104 is connected to subtract register 105 which stores the value representing heat loss until a sequencing signal is received on conductor 106 from sequencer 73. When the sequencing signal is received the subtract register 105 operates to apply the value stored therein over bus 107 to register 68.

Thus the registers 66, 67 and 68 have values which represent the temperatures of the starting portion of the conductors (region A, FIG. 2), of the main portion of the conductors (region B, FIG. 2), and of the core material (generally region C, FIG. 2). The registers 66, 67 and 68 are connected by respective buses 110, 111 and 112 to respective temperature detectors 113, 114 and 115. The temperature detectors 113, 114 and 115 have reference temperatures set in at reference inputs 116, 117 and 118 respectively. When the temperature signal on bus 110, 111 or 112 exceeds the temperature set in at a respective reference input 116, 117 and 118, the respective temperature detector 113, 114 and 115 provides a signal on the respective conductor 120, 121 or 122 indicating the reference temperature has been exceeded. The signal on conductor 120, 121 and 122 indicating the reference has been exceeded, may be used to trip an alarm or to interrupt the supply to the motor by tripping a breaker, for example.

Figure 5:
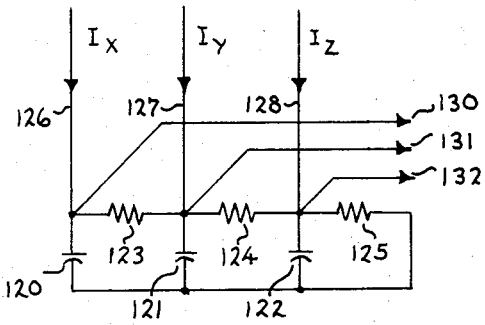

The embodiment of the invention as depicted in FIG. 4 is preferably implemented in digital form, as by performing the various functions described in a computer. FIG. 5, however, illustrates a form of the invention which includes analog aspects. Three currents such as those appearing on buses 60, 61 and 62 of FIG. 4 and which have been previously designated $I_X$, $I_Y$ and $I_Z$ are furnished to a circuit having three capacitors 120, 121 and 122 which are selected to represent the heat capacities respectively of regions A, B and C (FIG. 2). Three resistors 123, 124 and 125 represent, respectively, the thermal resistance from the region A to B (that is, the thermal resistance between the peripheral portion of a conductor bar and the inner or main portion), the thermal resistance from the region B to C (that is, the thermal resistance between the conductor bar to the core material) and the thermal resistance from region C to ambient, (that is, from the core stack to ambient). A current $I_X$ is applied via conductor 126 and this current represents heat generation in the peripheral portion of the conductor bar (region A). A current $I_Y$ is applied via conductor 127 and this current represents heat generation in the main portion or inner portion of the conductor bar (region B). A current $I_Z$ is applied via conductor 128 and this current represents heat generated in the core of the rotor (region C). The voltages on conductors 130, 131 and 132 represent, respectively, the temperature of the outer or peripheral portion of the conductor (region A), the temperature of the inner or main portion of the conductor (region B), and the temperature of the core material (region C).

As was the case with the FIG. 4 embodiment, it is possible to expand the circuitry of FIG. 5 to include more regions where the temperature might be of interest, but the circuitry becomes more complex.

The conductors 130, 131 and 132 can be connected to a temperature detector (not shown in FIG. 2 but similar to that described with respect to FIG. 4) which provides a tripping signal when a predetermined voltage, representing a predetermined temperature is reached for any region.

In summary, the invention provides a thermal model of a rotor of a squirrel cage motor where different critical areas have their temperatures modelled and if the temperature in any one of the areas exceeds a predetermined level the supply of power to the motor may be interrupted or other action such as an alarm taken. The invention is conveniently used in conjunction with apparatus for protecting the stator against over-temperatures.

It should be noted that the modelled results tend to be convergent. For example, if the modelling set up was inaccurate and say the current $I_Y$ was greater than the current which would cause the same amount of heat to be generated in the respective model region as was actually generated in that region during operation, then (referring to FIG. 5 for simplicity) the voltage on capacitor 121, i.e., the voltage at the junction of resistors 123 and 124, would increase to a level greater than it should. However, although the current $I_Y$ is too large, the voltage on capacitor 121 will not continue to increase. The greater voltage on capacitor 121 will alter the voltages across resistor 123 and resistor 124 (and subsequently resistor 125). This change in voltage across resistors 123 and 124 will alter the current in proportion to the voltage changes. The result is that the incorrectly designed higher current $I_Y$ will cause a voltage increase on capacitor 121 which will stabilize as the current through the resistors responds accordingly, and the temperatures represented by the voltages on conductors 130, 131 and 132 may all be raised somewhat. The system however will be stable in that an increased $I_Y$ will not result in the continuous increase of the voltage on capacitor 121; i.e., on conductor 131. This is analogous to the actual heat levels in the motor. If the temperature at one point is increased abnormally, the temperature difference between that point and adjacent points will increase, and the increased temperature difference will increase the heat flow tending to stabilize the system. Thus, both the actual heat system and the model tend to be convergent. This reduces the significance of small errors in setting up the thermal model without affecting to any practical extent the accuracy of the behaviour of the model to frequency related faults.

It will be understood that various other embodiments and modifications will be apparent to those skilled in the art in addition to those specifically discussed, that is, the use of a motor signal representing the changing motor speeds and the use of a sensor to provide an ambient temperature signal. In the case of using actual motor speeds in FIG. 4, for example, rather than having two distinct values for the constants $K_1$ and $K_2$, the value used could vary as a function of motor speed (e.g., as by an exponential function). Also, the invention has been described in detail with reference to three phase motors but the principles and concepts are applicable to motors operating on two or more phases, when conditions are present which cause high frequencies to be induced in the rotor. These high frequency currents in the rotor may result from the phases being unbalanced or from harmonics in the supply and, of course, from both occurring at the same time.

It is not desired, therefore, that the present invention be limited to the specific embodiments shown and described but that the appended claims be construed in accordance with the true spirit and scope of the invention.

What is claimed:

1. Apparatus for protecting an induction motor including a stator having a stator winding for connection to an alternating current supply of two or more phases and a squirrel cage rotor, said rotor having a plurality of conductors each having a starting portion and a main portion, currents of higher frequency induced in said conductors tending to be in said starting portion and currents of lower frequency tending to be in said main portion, said apparatus comprising:
    means connected to said supply to said stator winding for determining values for positive sequence current components supplied to said stator winding and for providing first signals representing the positive sequence components,
    means for providing a second signal as a function of the rotational speed of said rotor,
    heat calculation means for receiving said first and second signals and deriving equivalent current values for each said component for at least said starting portions and main portions of said conductors that would generate equivalent heat therein,
    summing means for summing the equivalent current values for each of said at least starting portions and said main portions of said conductors,
    storage means for each of said at least said starting portions and said main portions of said conductors for receiving the respective equivalent current to store a value representing the temperature,
    means connected between each said storage means representing thermal resistance to adjust the value in each storage means according to a heat transfer relationship, means connected to at least one of said storage means representing thermal resistance to ambient to adjust the respective storage means for heat lost to ambient, and temperature detector means connected to each storage means to determine if the value stored therein representing temperature exceeds a predetermined value representing a maximum temperature and for providing, when said stored value exceeds said predetermined value, and indication thereof.

2. Apparatus as defined in claim 1 in which said means connected to said supply to said stator winding also determines values for negative sequence components and provides additional first signals representing these values.

3. Apparatus as defined in claim 1 in which said means connected to said supply to said stator winding also determines values for lower harmonics present in the supply and provides additional first signals representing these values.

4. Apparatus as defined in claim 1 in which said means for providing a second signal provides an indication of a first condition when said motor is below normal running speed and a second condition when said motor is at normal running speed.

5. Apparatus as defined in claim 1 in which each said storage means is a capacitor and each means connected between each storage means is a resistor.

6. Apparatus for protecting an induction motor against excessive rotor temperatures, said motor having a stator with a stator winding for connection to an alternating supply of two or more phases and a squirrel cage rotor, said rotor having a core with a plurality of conductors each conductor having a starting portion of higher resistance adjacent the periphery of said core and a main portion extending inwardly of said starting portion, currents of higher frequency induced in said conductors tending to be in said starting portion and currents of lower frequency tending to be in said main portion, said apparatus comprising:

means connected to the supply to said stator winding for determining values for the positive and negative sequence current components of at least the fundamental frequency of said supply and providing first signals representing each said component, means for providing a second signal as a function of the rotational speed of said rotor, heat calculation means for receiving said first and second signals and deriving first, second and third equivalent current digital values for each said component for said starting portions, main portions and core, that would generate therein equivalent heat, first, second and third summing means for summing respectively said first, second and third equivalent current values for each of said components, first, second and third register means for periodically receiving from said first, second and third summing means the summed values of said first, second and third equivalent currents, respectively, and for storing these values, first scale means for receiving said summed values from said first and second register means, deriving a difference value, and providing third and fourth digital signals related to the difference value and representing heat transferred from said starting portions and heat transferred into said main portions respectively, means for periodically subtracting the value represented by said third digital signal from the value stored in said first register means, means for periodically adding the value represented by said fourth signal to the value stored in said second register means, third scale means for receiving said summed value from said third register means, comparing said summed value from said third register means with a value representing ambient temperature and deriving a difference value, and providing a seventh digital signal related to the difference and representing heat transferred from said core to ambient, means for periodically subtracting the value represented by said seventh digital signal from said third register means, first and second detector means connected to said first and second register means respectively, for receiving the values stored therein representing temperature in said starting portions and main portions of said conductors respectively, comparing said respective received value with a value representing a critical temperature, and for providing an indicating signal when a respective received value exceeds a respective critical value for indicating an overtemperature condition of said motor.

7. Apparatus as defined in claim 6 and further including a third detector means connected to said third register for receiving the values stored therein representing core temperature, comparing the received value with a value representing a critical temperature, and for providing an indicating signal when said received value exceeds said value representing a critical temperature for indicating an overtemperature condition of said motor.

8. Apparatus as defined in claim 6 and further including means for applying said second signal to said third scale means for adjustment of said seventh digital signal representing heat transferred from said core in accordance with the rotational speed of said rotor.

9. Apparatus as defined in claim 7 in which said means for providing a second signal is a sensor which provides a periodic digital representing rotational speed for each period.

10. Apparatus as defined in claim 9 and further including means for applying said second signal to said first, second and third scale means for adjustment of the respective signals provided thereby in accordance with changing values of heat lost to ambient due to different rotational speeds.

11. Apparatus as defined in claim 7 in which said means connected to the supply to said stator winding determines values for the positive and negative sequence components for the second and third harmonic frequencies in addition to said fundamental frequency.

12. Apparatus for protecting an induction motor against excessive rotor temperatures, said motor having a stator with a stator winding for connection to a three phase alternating power supply and a squirrel cage rotor, said rotor having a core with a plurality of conductors, each conductor having a starting portion of higher effective resistance adjacent the periphery of said core and a main portion extending radially inwardly of said starting portion, currents of higher frequency induced in said conductors tending to be in said starting portion and currents of lower frequency tending to be in said main portion, said apparatus comprising:

means connected to said stator winding for determining values for the power supplied thereto for the positive and negative sequence current components of the fundamental frequency and at least the second and third harmonic frequencies and for providing respective first digital signals for each component of each such frequency, sensor means for sensing rotor speed and for providing a second digital signal as a function of rotor speed, a heat calculation circuit for each of said current components of each frequency for receiving a respective one of said first signals and said second signal and deriving first, second and third digital values for each said component representing an equivalent current that would generate the same heat in the starting portions, main portions and core, first, second and third summing circuits each connected to said heat calculation circuits to receive respectively the first, second and third digital values from each heat calculation circuit for summing the values and providing third, fourth and fifth digital signals representing the summed values, first, second and third registers, means to provide sequencing signals, first, second and third adding means respectively connected between said first, second and third summing circuits and said first, second and third registers, and responsive to a first sequencing signal to add the values represented by said third, fourth and fifth signals to said first, second and third registers, respectively, a first scale means connected between said first and second registers receiving the values stored therein representing the temperature of the starting portions and main portions, deriving a difference value, and providing sixth and seventh digital signals representing respectively heat transferred from said starting portions and heat transferred into said main portions, a first subtracting means connected between said first scale means and said first register and responsive to a second sequencing signal to subtract the value represented by said sixth signal from the value stored in said first register, a fourth adding means connected between said first scale means and said second register and responsive to a third sequencing signal to add the value represented by said seventh signal to the value stored in said second register, a second scale means connected between said second and third registers receiving values stored therein representing the temperature of the main portions and the core, deriving a difference value, and providing eighth and ninth digital signals representing respectively heat transferred from said main portions and heat transferred into said core, a second subtracting means connected between said second scale means and said second register and responsive to a fourth sequencing signal to subtract the value represented by said eighth signal from the value stored in said second register, a fifth adding means connected between said second scale means and said third register and responsive to a fifth sequencing signal to add the value represented by said ninth signal to said third register, a third scale means connected to said third register to receive the value stored therein and connected to a signal source providing a digital signal representing ambient temperature, deriving a difference value, and providing a tenth signal representing heat transferred from said core, a third subtracting means connected between said third scale means and said third register and responsive to a sixth sequencing signal to subtract the value represented by said tenth signal from the value stored in said third register, means for applying said second signal to said third scale means for adjustment of said tenth signal in accordance with the rotational speed of said rotor, said first, second and third registers holding values representing the temperatures of said starting portions, said main portions, and said core respectively, at least a first temperature detector connected to said first register for receiving the value stored therein, comparing it with a value representing a critical temperature, and providing a trip signal when the stored value exceeds the value representing the critical temperature for interrupting the supply of power to the motor.

13. Apparatus as defined in claim 12 and further comprising:

second and third temperature detectors connected to said second and third registers respectively for receiving the respective values stored therein, comparing the respective value stored with a respective critical value representing a critical temperature, and providing a trip signal when a respective stored value exceeds the respective critical value for interrupting the supply of power to the motor.

14. Protective apparatus for a squirrel cage motor having a stator winding for connection to an alternating supply of two or more phases and a rotor having a plurality of conductors, each said conductor having a starting portion and a main portion, comprising means connected to said stator winding for determining values for the power supplied thereto for the positive and negative sequence components of at least the fundamental frequency and providing first signals representing the determined values, means for providing a second signal representing the rotational speed of said rotor, heat calculation means for receiving said first and second signals and deriving a value for each said component of an equivalent current that would generate equivalent heat in said starting and main portions, summing means for said starting portions and said main portions for summing the equivalent current values derived for each component, storage means for storing the summed equivalent current values for said starting portions and main portions representing the temperatures in the starting and main portions of the conductors, means connected to said storage means for representing thermal resistance for adjusting the values stored in said storage means according to a heat transfer relationship determined between said starting and main portions, means connected to said storage means representing thermal resistance to ambient for adjusting the values stored in said storage means according to heat lost to ambient, and at least a temperature detector means connected to said storage means for comparing the stored value representing the temperature of the starting portions with a predetermined critical value representing a critical temperature and providing a signal indicating an overtemperature condition when the value representing critical temperature is exceeded.

15. A method for protecting a squirrel cage induction motor, including a stator having windings to which phase currents are supplied from a polyphase source of electrical power and a rotor including a core and a plurality of conductors each having a starting portion of higher resistance disposed adjacent the periphery of said core and a main portion extending radially inwardly from said starting portion, comprising the steps:
   (a) developing current signals proportional to the phase currents supplied to said stator windings;
   (b) developing from said current signals intermediate signals representing substantially only those currents at the fundamental frequency of the polyphase source;
   (c) deriving from said intermediate signals first signal values for at least the positive sequence current components of said intermediate signals;
   (d) developing a second signal as a function of rotor rotational speed;
   (e) calculating from said first signals and said second signal individual values representing the heat generated in each of said starting and main portions of said conductors and in said core;
   (f) storing said individual values;
   (g) adjusting the stored individual values as a function of the anticipated heat transfers with respect to said starting and main conductor portions and said core; and
   (h) evaluating said stored individual values to determine if any represents a temperature in excess of a prescribed value.

16. A method for protecting a squirrel cage induction motor, including a stator having windings to which phase currents are supplied from a polyphase source of electrical power and a rotor including a core and a plurality of conductors each having a starting portion of higher resistance disposed adjacent the periphery of said core and a main portion extending radially inwardly from said starting portion, comprising the steps:
   (a) developing current signals proportional to the phase currents supplied to the stator windings;
   (b) developing from said current signals individual sets of intermediate signals representing, respectively, currents supplied to the stator at the fundamental frequency of the source and at specified harmonics thereof;
   (c) deriving from each of said individual sets of intermediate signals, individual sets of first signal values for the positive and negative sequence current components;
   (d) developing a second signal as a function of rotor rotational speed;
   (e) calculating from each of said individual sets of first signal values and from said second signal, individual heat values for said starting and main portions of the conductors and for said core resulting from each of said individual sets of intermediate signals;
   (f) separately summing the individual heat values relating to said starting portion, said main portion and said core to provide an initial temperature values for said starting portion, said main portion and said core;
   (g) adjusting said initial temperature values to compensate for heat transfers with respect thereto to develop adjusted temperature values; and
   (h) evaluating said adjusted temperature values to determine if any exceeds an associated predetermined value.

17. The method in accordance with claim 16 wherein the step of calculating the individual heat values involve the use of a first set of constants relative to the starting portion of the conductors, the main portion of the conductor and the core when the motor speed is below a prescribed value and the use of a different set of corresponding constants when the motor speed is above the prescribed value.

* * * * *

UNITED STATES PATENT AND TRADEMARK OFFICE
CERTIFICATE OF CORRECTION

PATENT NO. : 4,510,548
DATED : April 9, 1985
INVENTOR(S) : David R. Boothman

It is certified that error appears in the above-identified patent and that said Letters Patent are hereby corrected as shown below:

Column 14, after line 6, insert the following:

second scale means for receiving said summed values from said second and third register means, deriving a difference value, and providing fifth and sixth digital signals related to the difference value and representing heat transferred from said main portions and heat transferred into said core respectively,
     means for periodically subtracting the value represented by said fifth digital signal from the value stored in said second register means,
     means for periodically adding the value represented by said sixth signal to the value stored in said third register means, Signed and Sealed this First Day of October 1985

[SEAL]

Attest:

DONALD J. QUIGG

Attesting Officer

Commissioner of Patents and Trademarks—Designate